United States Patent [19]

Wine

[11] 4,336,555
[45] Jun. 22, 1982

[54] VIDEO ACCESSORY HAVING CHANNEL IDENTIFIER

[75] Inventor: Charles M. Wine, Princeton, N.J.

[73] Assignee: RCA Corporation, New York, N.Y.

[21] Appl. No.: 187,159

[22] Filed: Sep. 15, 1980

[51] Int. Cl.[3] .............................................. H04N 5/76
[52] U.S. Cl. .................................. 358/127; 358/191.1
[58] Field of Search .................... 358/127, 181, 191.1, 358/192.1, 190, 10, 139; 360/33, 31; 369/7, 53, 126, 129; 455/158, 154

[56] References Cited

U.S. PATENT DOCUMENTS

| | | | |
|---|---|---|---|
| 3,586,769 | 6/1971 | Luther | 360/33 |
| 3,775,554 | 11/1973 | Hjortzberg | 178/5.4 R |
| 3,775,555 | 11/1973 | Carlson | 178/6.8 |
| 3,829,891 | 8/1974 | Uchida | 358/127 |
| 4,031,548 | 6/1977 | Kato | 358/127 |
| 4,097,899 | 6/1978 | Yu | 358/181 |
| 4,151,557 | 4/1979 | Iida | 358/127 |
| 4,193,120 | 3/1980 | Yello | 360/33 |
| 4,206,483 | 6/1980 | Nakamura | 360/33 |

Primary Examiner—Bernard Konick
Assistant Examiner—Alan Faber
Attorney, Agent, or Firm—E. M. Whitacre; J. S. Tripoli; R. G. Coalter

[57] ABSTRACT

A video disc player, for use with a television receiving device having a tuner, includes a power switch, a source of baseband video signal and a switchable multi-channel TV modulator. Upon closure of the power switch the baseband signal is modulated on a selected TV channel and supplied to the television tuner. Channel prompting apparatus in the video disc player responds to initial closure of the power switch and to the selected channel of the modulator to produce a message perceptable to a user of the player, the message being indicative of the selected TV channel of the modulator, for prompting the user to select the corresponding channel on the receiving device. The message is communicated to the user by sight or sound upon initial activation of the player and may be subsequently followed by a further message indicative of an operating parameter of the player such as a playing time indication of the disc being played.

5 Claims, 1 Drawing Figure

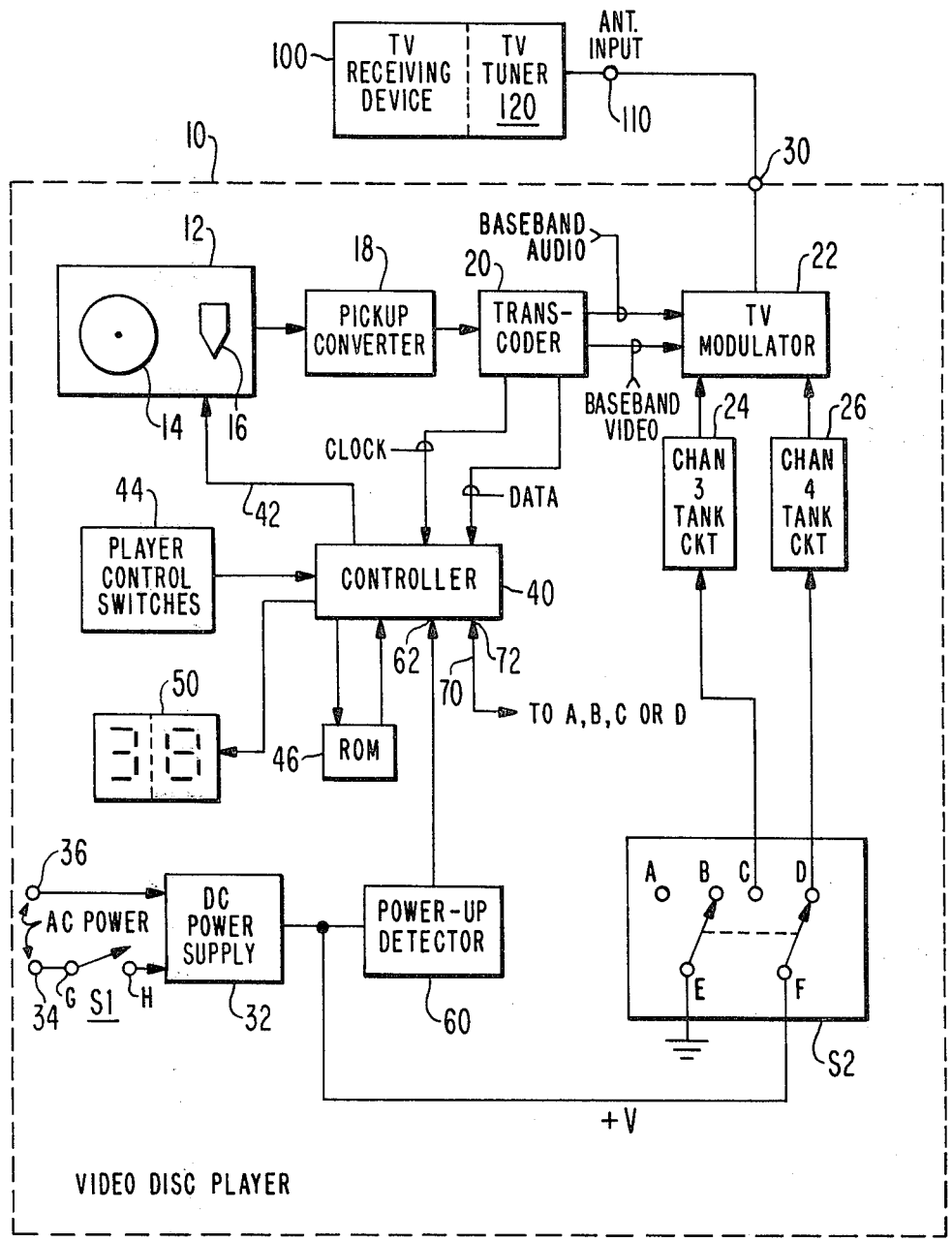

VIDEO ACCESSORY HAVING CHANNEL IDENTIFIER

This invention relates to video accessory apparatus of the type for producing video modulated carrier waves within one of a plurality of television channels for application to the antenna terminals of a television receiving device having a tuner such as a television receiver.

A number of video accessory products are known which utilize a conventional (unmodified) television receiver as a display device. Some accessories (e.g., TV game devices, home computers, etc.) are designed to provide a video output signal on a single TV channel while other accessories (e.g., video disc or tape players) may be provided with a switch for controlling output signal channel selection. In the United States of America, for example, the selection typically is between two adjacent low band VHF channels (e.g., channels 2 and 3 or 3 and 4) and the user of the video accessory sets the apparatus to whichever channel is least subject to interference by strong local broadcast TV stations in the given location.

The present invention is directed to solving a heretofore unrecognized problem which may arise when "dual channel" TV accessories are used with a television receiver as a display device. (Analogous problems arise when the receiver is a recording rather than a display device). The problem is that the user may fail to recall the correct receiver channel setting when changing from normal broadcast reception to accessory operation. This problem is particularly troublesome when the same receiver (or recorder) is used in conjunction with more than one accessory in addition to its normal broadcast receiving function.

Illustratively, consider the case where the user has a video game which produces an output signal on TV channel 2, a home computer operating on channel 3, a video tape recorder capable of operation on either of channels 2 or 3 and a video disc player designed for operation on either of channels 3 or 4. In such a case, three different receiver channel settings may be required for the four accessories. If the user does not recall the correct setting it may be necessary to review the accessory operation manual to find it. Alternatively, the user could simply wait for the television receiver to "warm up" and then seek the correct channel by switching his receiver tuner through all possible channels that the accessory might be set to in order to identify the correct channel.

It is an object of the present invention to prompt the user to set the television receiver to the correct channel upon activation of the accessory. A desirable further objective of the invention is to communicate a channel prompting message to the user upon initial activation of the accessory followed by a further message representative of the status of an operating parameter of the accessory other than channel selection.

In accordance with the invention, a video accessory for use with a television receiving means comprises a combination including a first switch means responsive in a closed condition for applying operating power to the accessory. A signal source means provides a base band video signal to a modulator means which produces a modulated carrier wave within a selected channel of a plurality of television channels for application to the television receiving means. A second switch means applies a control signal to the modulator means for controlling selection of the television channel occupied by the carrier wave. Channel prompting means, responsive to initial closure of the first switch means and to a control signal manifestation produced by the second switch means, produces a message perceptable to a user of the accessory. The message is indicative of the selected television channel of the modulator means for prompting the user to select the corresponding channel on the television receiving means.

The sole FIGURE illustrates in block and schematic diagram form a preferred application of the principles of the invention to a video disc player 10 which supplies picture carrier waves on channels 3 or 4 to the antenna input terminal 110 of a television receiving device 100 having a tuner 120. It will be appreciated that the receiving device 100 may be any form of television receiving means having a tuner capable of being tuned to the output channel frequencies of player 10. Device 100 may be, for example, a conventional direct view television receiver. Alternatively, it may be a projection type receiver or a video tape recorder of the type having a television tuner as is common in cassette recorders manufactured for consumer use in the home.

Player 10 includes a player mechanism 12 having a turntable for rotating a video disc record 14 and a pickup transducer 16 for recovering a video signal from the record. Illustratively, it will be assumed that the player is intended for use with records in which information is stored in the form of topological variations and recovered by sensing capacitance variations between pickup transducer 16 and the record 14. The output of transducer 16 is coupled to the input of a pickup converter 18 which includes a capacitance-to-voltage converter responsive to capacitance variations between a stylus in transducer 16 and the record being played for producing an FM output signal voltage representative of the recorded information. Such records and suitable circuits for implementing the capacitance-to-voltage conversion function of converter 18 are well known. See, for example, U.S. Pat. No. 3,783,196 entitled "HIGH DENSITY CAPACITIVE INFORMATION RECORDS AND PLAYBACK APPARATUS THEREFOR" which issued to T. O. Stanley, Jan. 1, 1974; U.S. Pat. No. 3,972,064 entitled "APPARATUS AND METHODS FOR PLAYBACK OF COLOR PICTURES/SOUND RECORDS" which issued to E. O. Keizer, July 27, 1976 and U.S. Pat. No. 3,711,641 entitled "VELOCITY ADJUSTING SYSTEM" which issued to R. C. Palmer, Jan. 16, 1973.

The output of converter 18 is applied to the input of a transcoder 20 which includes demodulators for demodulating the audio and video components of the FM signal to base band. Illustratively, the demodulators may be of the pulse counting type or of the phase-locked-loop (PLL) type. A suitable pulse counting type FM demodulator is disclosed in U.S. Pat. No. 4,038,686 entitled "DEFECT DETECTION AND COMPENSATION" which issued to A. L. Baker, July 26, 1977. An FM demodulator of the PLL type is described in the U.S. patent application Ser. No. 948,013 of T. J. Christopher, et al., entitled "FM SIGNAL DEMODULATOR WITH DEFECT DETECTION" filed Oct. 2, 1978 and which issued May 13, 1980 as U.S. Pat. No. 4,203,134.

It is preferable, in video disc player applications, that the video signal be recorded on disc 14 in the "buried subcarrier" (BSC) format proposed by D. H. Pritchard in U.S. Pat. No. 3,872,498 entitled "COLOR INFOR- MATION TRANSLATING SYSTEMS" which issued Mar. 18, 1975. In the BSC format, chrominance information is represented by a color subcarrier of the general form employed in the well-known NTSC format. However, the chrominance component in the BSC format is not located in the high end of the luminance signal band, as in NTSC, but rather is buried in a lower portion of the video band. Accordingly, transcoder 20 includes conversion circuitry for translating the recovered chrominance signal component to the high end of the video signal band. Pritchard describes a suitable converter. Another suitable converter in which errors in the disc-transducer relative velocity and errors in the chrominance signal frequency are corrected by means of a color burst locked two loop servo system is described in U.S. Pat. No. 3,965,482 of T. W. Burrus.

A preferred implementation of transcoder 20 for NTSC standard players is disclosed in the U.S. patent application of G. D. Pyles, J. A. Wilber and T. J. Christopher entitled "FAST RECOVERY SQUELCH CIRCUIT FOR A VIDEO DISC PLAYER" Ser. No. 068,015 filed Aug. 20, 1979, now U.S. Pat. No. 4,286,290. A suitable implementation for PAL standard players is disclosed in the U.S. patent application of J. G. Amery entitled "CHROMINANCE TRANSCODER" Ser. No. 154,597 filed May 29, 1980.

The base band audio and video signals produced by transcoder 20 are applied to a TV modulator 22 having two tank circuits 24 and 26 in which L-C elements are selected to resonate at the carrier frequencies of TV channels 3 and 4, respectively. Modulator 22 provides a carrier wave within TV channel 3 to output terminal 30 of player 10 in response to application of a d.c. operating voltage via tank circuit 24 to an oscillator within the modulator. Carrier waves within channel 4 are provided to terminal 30 in response to application of the d.c. operating voltage to a second oscillator within modulator 22 via tank circuit 26. An integrated circuit suitable for use as TV modulator 20 and which may be selectively operated on channel 3 or 4 by application of an operating voltage to appropriate tank circuits is the model LM1889N "TV VIDEO MODULATOR" made by National Semiconductor Company, Inc.

Operating voltages for controlling TV channel selection are applied to tank circuits 24 and 26 by means of terminals C-D-F of a double-pole double-throw (DPDT) switch S2. When switch S2 is in the position illustrated, an operating voltage, +V, supplied to the switch input terminal F, is coupled to the switch output terminal D and thence via the channel 4 tank circuit 26 to the second oscillator in modulator 22 thereby causing modulator 22 to supply a modulated sound and picture carrier wave within the channel 4 frequency band to output terminal 30. Reversal of the position of switch S2 couples terminal F to output terminal C which activates the channel 3 oscillator in modulator 22 whereby the carrier wave at terminal 30 is switched from channel 4 to channel 3.

The channel selection operating voltage +V is produced by d.c. power supply 32 upon closure of the player ON-OFF power switch S1 which couples AC power terminal 34 to power supply 32 when closed. The other AC power terminal 36 is coupled directly to power supply 32. Supply 32 may be of conventional design and provides d.c. operating voltages to all elements of the player 10 requiring them. To simplify the drawing, however, the d.c. supply lines to elements other than a power-up detector and switch S2 are not illustrated. Also, not shown, is an A.C. supply line from terminal 36 and pole H of switch S1 to operate a turntable drive motor for rotating disc 14.

Player 10 includes a controller 40 which, preferably, is microprocessor based (as opposed to being implemented with random logic) for providing various supervisory control and information display functions. The control functions (supplied via cable 42 to mechanism 12) include, illustratively, control of the radial position, elevation, velocity and direction of movement of pickup transducer 16 relative to disc 14. Some of the functions are initiated manually by means of player control switches 44 coupled to an input port of the controller 40. Manually initiated functions include, illustratively, play, pause, slow scan forward or reverse and fast forward or reverse. Upon closure of one of switches 44, controller 40 addresses read only memory (ROM) 46 and fetches an appropriate sequence of instructions resident in the memory for effecting the desired control function. Controller 40, in combination with instructions resident in ROM 46 and data recovered from disc 14 also provides automatic control functions such as correcting for disc defects (commonly known as "locked grooves") and display of the disc playing time via a two digit light emitting diode (LED) display 50.

Controller 40 is preferably of the kind described by C. B. Dieterich in U.S. patent application Ser. No. 084,393 filed Oct. 12, 1979 entitled "VIDEO DISC SYSTEM", now U.S. Pat. No. 4,308,557. Controller 40 receives clock and data signals from transcoder 20 and is preferably interfaced therewith by means of a PCM detector in transcoder 20 as described in C. B. Dieterich's U.S. patent application entitled "PCM DETECTOR" Ser. No. 125,641 filed Feb. 28, 1980 and which issued June 23, 1981 as U.S. Pat. No. 4,275,416. Other U.S. patent applications which provide preferred methods of verifying the validity of the data, data framing, data recording, calculations of playing time from received data and transducer control include: "VIDEO DISC PLAYER SYSTEM FOR CORRELATING STYLUS POSITION WITH INFORMATION PREVIOUSLY DETECTED FROM DISC" Ser. No. 084,392 filed Oct. 12, 1979 by M. J. Mindel and J. C. Rustman now U.S. Pat. No. 4,307,418; "IMPROVED DIGITAL ON VIDEO RECORDING AND PLAYBACK SYSTEM" Ser. No. 084,465 filed Oct. 12, 1979 by T. J. Christopher and C. B. Dieterich; "IMPROVED ERROR CODING FOR VIDEO DISC SYSTEM" Ser. No. 084,396 filed Oct. 12, 1979 by T. J. Christopher; and "TRACK ERROR CORRECTION SYSTEM AS FOR VIDEO DISC PLAYER" Ser. No. 084,386 filed Oct. 12, 1979 by J. C. Rustman and M. J. Mindel.

LED display 50, in normal operation of player 10, serves as a means for visually communicating a message representative of disc playing time to the user of the player as previously mentioned. In this example of the invention, display 50 serves the additional function of communicating a message to the user indicative of the selected television channel (3 or 4) of modulator 22 for prompting the user to set tuner 120 of the TV receiving device to the corresponding channel. This "dual function" feature of the invention eliminates the need for a second message communicating device thereby providing a cost reduction and enhanced reliability due to the fewer number of parts needed. The prompting message is produced upon closure of the player power switch S1 and lasts for a relatively short period of time (e.g., a few seconds) as the turntable which rotates disc 14 is accelerating to normal operating speed. The prompting message then terminates and display 50 changes to its normal mode of indicating disc playing time. For the two digit seven segment LED display illustrated, a preferred prompting message is "PL" (meaning "play") followed by "CH" (meaning "channel") followed by the channel number (3 or 4) to which modulator 22 is set. The message may be repeated several times during the record "spin-up" (i.e., acceleration) time.

Generation of the prompting message communicated by display 50 is provided by controller 40 and a prompting message program resident in ROM 46. (For maximum memory efficiency, a low level programming language such as assembly language may be used for the prompting sub-routine). Two kinds of information for controller 40 are needed in the system illustrated for generation of the prompting message. They are (1) timing information (when to generate the message) and (2) data (the identity of the channel to which modulator 22 is set).

Timing information for initiating production of the prompting message is produced by power up detector 60 having an input coupled to an output of supply 32 and an output coupled to an input terminal 62 of controller 40. When power switch S1 is closed, detector 60 supplies an output pulse to terminal 62 in response to the resultant increase (from zero) of the d.c. supply voltage +V. Controller 40 then initiates production of the prompting message.

Data information is simultaneously supplied to input terminal 72 of controller 40 by means of conductor 70 coupled between terminal 72 and any one of the output terminals A, B, C or D of switch S2. If terminals A or B are used terminal E should be coupled to a suitable reference voltage point such as ground (as shown) or another suitable d.c. voltage produced by supply 32. If terminal A is coupled to terminal 72, then terminal 72 will be grounded when channel 3 is selected and open circuited when channel 4 is selected as shown in the FIGURE. A definite logic signal level may be established for the latter case by coupling an appropriate "pull up" resistor between terminal 72 and a suitable supply voltage source. If one of terminals C or D is used, then a potential divider or voltage level shifter may be needed if controller 40 is designed for logic input levels other than ground and +V (the operating voltage supplied to modulator 22).

It will be appreciated that various changes and modifications may be made to the video accessory shown and described. Mechanism 12 may be a video tape deck rather than a video disc player mechanism. The accessory may have visual indicators (e.g., a lamp) separate from display 50 for indicating the prompting message. The lamp could indicate the appropriate channel by flashing a corresponding number of times. Another message communicating alternative would be an audible device for producing tones or tone sequences. Although substantial memory may be required, the prompting message could be generated by a voice synthesizer coupled to controller 40.

What is claimed is:

1. A video accessory for use with a television receiving means, said accessory comprising, in combination:
   first switch means for applying operating power to said accessory;
   signal source means for providing a baseband video signal;
   modulator means, responsive to said baseband video signal, for producing a modulated carrier wave within a selected channel of a plurality of television channels for application to said television receiving means;
   second switch means for applying a control signal to said modulator means for controlling selection of the television channel occupied by said carrier wave; and
   channel prompting means in said accessory, responsive to initial closure of said first switch means and to a control signal manifestation produced by said second switch means, for producing a message perceptable to a user of said accessory, said message being indicative of the selected television channel of said modulator means for prompting the user to select the corresponding channel on said television receiving means.

2. The combination recited in claim 1 wherein said channel prompting means comprises:
   visual display means responsive to prompting message control signals supplied thereto for producing said message; and
   controller means having input means coupled to said first and second switch means and output means coupled to said display means for supplying said prompting message control signals thereto for a predetermined period of time subsequent to said initial closure of said first switch means.

3. The combination recited in claim 2 further comprising:
   means for deriving a data signal from said baseband video signal representative of an operating parameter of said video accessory other than the selected television channel of said modulator means;
   means for applying said data signal to said controller means; and
   means in said controller means responsive to said data signal for producing and supplying data control signals to said display means subsequent to said predetermined time for causing said display means to display said operating parameter of said video accessory.

4. A video player accessory for use with a television receiving means of the type having a multi-channel tuner, said accessory comprising, in combination:
   power control switch means for controlling a supply of operating power to said accessory, said power control switch means being responsive in a closed condition for applying said operating power to said accessory;
   signal source means for receiving a recording medium and responsive in a play mode of operation for deriving a baseband video signal from said recording medium;
   television channel modulator means, responsive to said baseband video signal, for producing a modulated picture carrier wave within a selected channel of a plurality of television channels for application to said tuner of said television receiving means;
   channel selector switch means coupled to said modulator means for applying a control signal to said modulator means for controlling selection of the television channel occupied by said carrier wave; and channel prompting means in said accessory, responsive to initial closure of said power control switch means and to said channel selector switch means, for producing a message perceptable to a user of said accessory, said message being of predetermined duration and indicative of the selected television channel of said modulator means for prompting the user to select the corresponding channel on said multi-channel tuner of said television receiving means.

5. The combination recited in claim 4 wherein said channel prompting means comprises:
 a microprocessor-based controller means having input means coupled to said power control switch means and to said channel selector switch means and output means for supplying channel prompting message control signals to a visual display device in said accessory;
 means in said signal source means for deriving a data signal from said baseband video signal and for supplying said data signal to said controller means; and
 means in said controller means for deriving playing time control signals from said data signal and for supplying said playing time control signals to said visual display device subsequent to said channel prompting message for causing said display device to display, in sequence, said channel prompting message and said playing time message.

* * * * *